Patented Oct. 29, 1946

2,410,225

UNITED STATES PATENT OFFICE 2,410,225

COATING BY FLAME-SPRAYING METHOD

Maurice L. Macht, Jersey City, and Malcolm M. Renfrew, Arlington, N. J., assignors to E. I. du Pont de Nemours & Company, Wilmington, Del., a corporation of Delaware No Drawing. Application June 17, 1942,
Serial No. 447,452

4 Claims. (Cl. 117—104)

The present invention relates to the coating of surfaces by the flame-spraying method and, more particularly, relates to the flame-spray coating of surfaces with organic thermoplastic materials.

The technique of flame-spraying, i. e., of applying to a surface of metal a coating of metal of comparatively low melting point by the application of a spray of the metal in molten condition, has been in commercial use for some years past. It has been practiced with flame-spraying devices of two general types, namely, the so-called "powder-pistol" in which the metal to be fused is delivered continuously in finely-divided form into a jet of flame which serves to melt the particles of metal and to throw the spray of molten particles upon the surface to be coated, and the so-called "wire pistol" in which a wire or ribbon of the fusible metal is continuously fed into a jet of flame for the same purpose. For use in the powder-pistol, it has been found necessary that the fusible metal be reduced to particles not coarser than about 150-mesh and, preferably, of 300-mesh or finer.

More recently, attempts to adapt this flame-spraying technique to the deposition of coatings of organic thermoplastic materials have resulted in commercial flame-spraying of certain organic substances, notably polymers of cashew nut oil and synthetic rubber of the olefin-polysulfide type. The utility of the resulting coatings of these materials has, however, been limited by a plurality of defects.

An object of the present invention is to provide a method of flame-spray coating surfaces with certain organic thermoplastic materials to deposit on the surfaces coatings of appreciable thickness which are of good color, transparent if desired, tough, adherent, impermeable, and durable, and characterized by excellent electrical insulating properties and by inertness to chemicals and solvents—or, more precisely, coatings having outstanding combinations of excellence with respect to these properties since obviously the different individual organic thermoplastic materials described herein do not exhibit all of these characteristics to identical degrees. A further object is to provide simple means of incorporating coloring materials and fillers in such coatings. Other objects will be apparent from the description of the invention given hereinafter.

The above objects are accomplished according to the present invention by feeding into a flame-spraying device, more particularly of the powder-pistol type, along with a fuel and oxygen, an organic thermoplastic material in finely-divided form passing a 50-mesh screen and substantially all retained on a 200-mesh screen, the fuel, oxygen, and thermoplastic material being proportioned so that they insure complete combustion of the fuel and give a smokeless spray of the thermoplastic material in the form of molten droplets, the thermoplastic material comprising a polymer selected from the group consisting of polyvinyl butyral resins of the following composition, by weight:

| | Per cent |
|---|---|
| Polyvinyl acetate | 0.0 to 1.0 |
| Polyvinyl alcohol | 10 to 20 |
| Polyvinyl butyral | 79 to 90 | fusible ethylene polymers having a molecular weight of at least about 10,000 and containing up to 80% of cyclorubber, and methyl methacrylate polymers substantially free of material soluble in ethyl alcohol, and directing said spray upon a surface to be coated.

Preferably, the particle size in the greater part of any single lot of thermoplastic material to be used in the process should lie within a comparatively narrow range within the broad operative range set forth above.

In carrying out the process of this invention a flame-spraying device is employed, preferably the type known as a powder-pistol such as described in United States Patent 2,108,998 and Reissue Patent 20,425. The finely-divided organic thermoplastic material is drawn by suction into a flame produced by a mixture of oxygen and a fuel gas such as propane. The relative proportions of oxygen and fuel gas fed to the device is adjusted so that there is little more oxygen than is required to insure complete combustion of the fuel gas in order that the flame shall be smokeless and thus not deposit carbon with the coating, and yet no appreciable oxidation of the organic thermoplastic material shall take place.

When the temperature and oxidizing power of the flame are suitably adjusted by the control of the feeds of oxygen and fuel gas, as well as the air which accompanies the finely-divided thermoplastic material and is to some extent a factor in determining the oxidizing power of the flame, the organic thermoplastic material is completely fused into droplets without undergoing appreciable oxidation despite the fact that the flame, when adjusted to insure complete combustion of the fuel gas, will inevitably be, to some slight degree, of oxidizing character.

The nozzle from which the flame issues is held at a distance of about 8 to 12 inches from the surface to be coated. The organic thermoplastic material, melted in the flame, is thus directed upon the surface to be coated and, impinging thereon while still in molten condition, builds up on the surface in the form of a dense and homogeneous coating which may be several thousandths of an inch in thickness. Additional coats may be superimposed upon the first coat.

It will be understood that the surfaces to be coated in accordance with the procedure of this invention must be relatively heat-resistant. Since the temperatures of the organic thermoplastic materials herein considered, as such materials impinge upon the surface to be coated, will be little in excess of the respective melting points of the materials, ordinary structural metals and alloys will be obviously sufficiently heat-resistant as will glass and ceramic products in general. Further, because of the relatively low melting temperatures of the thermoplastic materials used, the coatings may be applied to less obviously heat-resistant substances such as wood, paper, and organic textiles if suitable precautions are taken.

To obtain a satisfactory coating, the surface to be coated must be suitably clean. Where the thermoplastic material is a polyvinyl butyral resin, it is only necessary that the surface be reasonably clean but where an ethylene polymer or methyl methacrylate polymer is employed, the surface to be coated must first be scrupulously cleaned, e. g. in the case of a metal, by shot-blasting.

A surprising feature of the present invention is that the thermoplastic materials here considered are only capable of satisfactory use in the process of flame-spraying by the powder-pistol when delivered to the latter in the form of relatively coarse particles lying within the limits heretofore stated. Long experience has demonstrated that metals, despite their small heat capacity and excellent thermo-conductivity, must be extremely finely divided (ordinarily to pass a 150-mesh screen) for the deposition of satisfactory coatings from a powder-pistol. For this reason it was entirely unexpected that the organic thermoplastic materials of the present invention, which materials have heat capacities greater than those of most metals and which are notoriously poor conductors of heat, were only satisfactory for use when in the form of relatively coarse particles.

The upper limit of the coarseness of the particles of the organic thermoplastic material, namely, failure to pass a 50-mesh screen, is fixed apparently by the failure of a particle of greater coarseness to have sufficient time to become completely fused during its brief exposure to the heat of the flame; attempts to use particles coarser than this limit have resulted in the deposition of a coating which is at least microscropically pebbled, or incompletely transparent, or both, as a result of non-uniformity or incompleteness of fusion. On the other hand, the limitation that no substantial part of the finely-divided organic thermoplastic material shall pass a 200-mesh screen is imposed by the practical considerations that such very fine material is less readily fed into the flame-spraying device and that particles of the material of such excessive fineness tend to be wholly or partially consumed by oxidation within the flame which leads to the undesirable results that the coating may be contaminated by charred particles and that the yield of the operation is impaired by the loss of material completely consumed.

Optimum results in accordance with the invention are obtained when the particle sizes in a given lot of organic thermoplastic material are held as nearly as feasible within narrower limits than 50-mesh to 200-mesh. Thus lots in which the particle sizes fall within ranges which are minor fractions of the total operative range, for example, 80-mesh to 120-mesh, or 120-mesh to 150-mesh, are preferable to a lot which embraces the whole range of 50-mesh to 200-mesh. That is, it is preferred that the particle sizes fall within a range covered by a difference of 30- or 40-mesh. Presumably the reason for this is that the provision of optimum conditions of feed, adjustment of the flame, and the like, as worked out for a more homogeneous material in particle size, comes closer to providing optimum conditions for all of its component particles.

Nevertheless, it is hardly to be expected in practice that the material shall be wholly free from particles finer than the finest particles deliberately included. Exclusion of unwanted coarse particles is relatively simple but it is not easy to exclude all very fine particles by screening. Fortunately, this latter has been found unnecessary because the process of the present invention tolerates the presence of minor proportions of material finer than 200-mesh.

The relatively coarse particles required for the present process are not necessarily integral particles of the stated size since the same result which is obtained with integral particles of a given size, is also obtained with agglomerates of that size, each agglomerate being composed actually of a plurality of particles of smaller size. The criterion of size for present purposes is the passage or the failure to pass through designated screens. Agglomerations having sufficient coherence to remain intact through the operation of screening will remain intact while being fed into the flame and are thus fully equivalent in behavior to integral particles of the same size.

The present invention further comprises the discovery that uniform incorporation of pigment or filler into the flame-sprayed coatings made by the herein considered technique may be effected by simple mechanical admixture of the former with the finely-divided organic thermoplastic material.

With respect to the particular polyvinyl butyral resins adapted for use in the instant invention, their preparation is well known to those skilled in the art. Likewise, it is known that the characteristics of the resin depend, inter alia, upon the molecular size of the polyvinyl ester, usually polyvinyl acetate, from which the resin has been derived, upon how nearly completely the polyvinyl ester has been hydrolyzed to polyvinyl alcohol and upon the extent to which the hydroxyl groups thus made available have been reacted with the butyraldehyde.

It has been found that those polyvinyl butyral resins which, upon analysis, contain:

|  | Per cent |
|---|---|
| Polyvinyl acetate | 0.0 to 1.0 |
| Polyvinyl alcohol | 10 to 20 |
| and preferably | 10 to 13.5 |
| Polyvinyl butyral | 79 to 90 |
| and preferably | 85.5 to 90 | and, preferably, which have a viscosity between about 15 and 100 centipoises, as determined in 5% solution in alcohol at 25° C., are adapted for flame-spraying by the technique of the present invention.

The polyvinyl butyral resin may be put into the necessary finely-divided form for use in the invention by being ground in a suitable mill and subsequently appropriately screened.

The following Examples 1 to 9 are given to illustrate the make-up of specific thermoplastic materials comprising a polyvinyl butyral resin and, in some instances, auxiliary agents, for use in the present invention, all parts being given by weight unless otherwise stated and viscosities being measured in 5% solution of the resin in alcohol at 25° C.

*Example I*

The material consisted of polyvinyl butyral resin of the following composition:

| | Per cent |
|---|---|
| Polyvinyl acetate | 0.5 |
| Polyvinyl alcohol | 12.9 |
| Polyvinyl butyral | 86.6 |

The resin had a viscosity of 55 centipoises and a screen analysis as follows:

| | Per cent |
|---|---|
| Through 50-mesh | 100 |
| Through 150-mesh | 15 |
| Through 200-mesh | 10 |

*Example II*

The material consisted of polyvinyl butyral resin of the following composition:

| | Per cent |
|---|---|
| Polyvinyl acetate | 0.5 |
| Polyvinyl alcohol | 10.1 |
| Polyvinyl butyral | 89.4 |

The resin had a viscosity of 90 centipoises and a screen analysis as follows:

| | Per cent |
|---|---|
| Through 80-mesh | 100 |
| Through 120-mesh | 0 |

*Example III*

The material consisted of polyvinyl butyral resin of the following composition:

| | Per cent |
|---|---|
| Polyvinyl acetate | 1.0 |
| Polyvinyl alcohol | 18.1 |
| Polyvinyl butyral | 80.9 |

The resin had a viscosity of 50 centipoises and a screen analysis as follows:

| | Per cent |
|---|---|
| Through 50-mesh | 100 |
| Through 200-mesh | 8 |

*Example IV*

The material consisted of polyvinyl butyral resin of the following composition:

| | Per cent |
|---|---|
| Polyvinyl acetate | 0.9 |
| Polyvinyl alcohol | 12.0 |
| Polyvinyl butyral | 87.1 | together with 2 parts, per 100 parts of the resin, of phenyl alpha naphthyl amine, an anti-oxidant. The resin had a viscosity of 55 centipoises and a screen analysis of:

| | Per cent |
|---|---|
| Through 50-mesh | 100 |
| Through 200-mesh | 14 |

*Example V*

The material consisted of polyvinyl butyral resin of the following composition:

| | Per cent |
|---|---|
| Polyvinyl acetate | 0.9 |
| Polyvinyl alcohol | 12.0 |
| Polyvinyl butyral | 87.1 | together with 10 parts, per 100 parts of resin, of dibutyl phthalate, a plasticizer. The resin had a viscosity of 55 centipoises and a screen analysis of:

| | Per cent |
|---|---|
| Through 80-mesh | 100 |
| Through 200-mesh | 8 |

*Example VI*

The material consisted of polyvinyl butyral resin of the following composition:

| | Per cent |
|---|---|
| Polyvinyl acetate | 1.0 |
| Polyvinyl alcohol | 12.5 |
| Polyvinyl butyral | 86.5 | together with 5 parts, per 100 parts of resin, of finely powdered silica as a filler. The resin had a viscosity of 60 centipoises and a screen analysis of:

| | Per cent |
|---|---|
| Through 80-mesh | 100 |
| Through 200-mesh | 10 |

*Example VII*

The material consisted of polyvinyl butyral resin of the following composition:

| | Per cent |
|---|---|
| Polyvinyl acetate | 1.0 |
| Polyvinyl alcohol | 12.5 |
| Polyvinyl butyral | 86.5 | together with 10 parts, per 100 parts of resin, of cadmium yellow, a pigment. The resin had a viscosity of 60 centipoises and a screen analysis of:

| | Per cent |
|---|---|
| Through 80-mesh | 100 |
| Through 200-mesh | 17 |

*Example VIII*

The material consisted of polyvinyl butyral resin of the following composition:

| | Per cent |
|---|---|
| Polyvinyl acetate | 0.9 |
| Polyvinyl alcohol | 12.0 |
| Polyvinyl butyral | 87.1 | together with 30 parts, per 100 parts of resin, of strontium sulfide, a luminescent pigment. The resin had a viscosity of 90 centipoises and a screen analysis of:

| | Per cent |
|---|---|
| Through 80-mesh | 100 |
| Through 150-mesh | 15 |
| Through 200-mesh | 10 |

*Example IX*

The material consisted of polyvinyl butyral resin of the following composition:

| | Per cent |
|---|---|
| Polyvinyl acetate | 0.9 |
| Polyvinyl alcohol | 12.0 |
| Polyvinyl butyral | 87.1 | together with 5 parts, per 100 parts of resin, of a thermoplastic phenol-formaldehyde resinoid which is a paratertiary butyl phenol-formaldehyde condensate (sold under the commercial name of "Bakelite BR-4036"). The polyvinyl butyral resin had a viscosity of 55 centipoises and a screen analysis of:

| | Per cent |
|---|---|
| Through 80-mesh | 100 |
| Through 200-mesh | 10 |

Examples VI, VII, and VIII illustrate compositions comprising pigments or fillers. Only those pigments or fillers will be used which will not be harmfully affected by the heat of the operation. The incorporation of these finely-divided infusible inorganic materials is accomplished by the simple procedure of stirring them with the comminuted organic thermoplastic material before feeding the latter into the flame. The fact that the filler or pigment in a flame-sprayed coating thus laid down is uniformly dispersed, at least to the degree that no lack of uniformity is visible to the unaided eye, is surprising in view of the almost universally contrary experience of users of fillers and pigments in plastics, paints, inks and the like, who cannot achieve a comparable uniformity of dispersal in these products without painstaking attention to a specific step designed to effect such dispersal, i. e., the use of masticating equipment, ink-mills, and the like.

Example VIII illustrates a composition comprising luminescent strontium sulfide and the resulting coating possesses luminosity to a high degree despite the natural expectation that this characteristic of the resin would be lost or seriously impaired by the heat of the operation. Useful luminosity is secured by the addition of as little as 5 parts of this pigment while the effect reaches a maximum when about 30 parts is used although even larger amounts may have a longer life under conditions of extremely high humidity.

With reference to the ethylene polymers adapted for use in the instant invention, the polymerization of ethylene in the presence of small amounts of oxygen leads, as is known, to the formation of macromolecular substances of resinous character, the properties of which are subject to control over considerable range by selection of the conditions of the polymerization, and subject also to modification by the incorporation of auxiliary substances, prior to, during, or after the polymerization. It has been found that ethylene polymers are suitable for application by the present flame-spraying technique and produce coatings of acceptable characteristics if their average molecular weights are in excess of about 10,000 as determined by the generally accepted method of Staudinger.

The ethylene polymers must be those of fusible type, that is, capable of being melted at temperatures below those which will cause their decomposition. Infusibility, under this definition, is not the result of excessively high molecular weight but rather is due to excessive cross-linkages between molecules, and thus no upper limit of molecular weight is of significance.

The characteristics of a flame-sprayed coating of the ethylene polymers, particularly their hardness and the strength and permanence of their adherence to the surface which they coat, is improved by the admixture of the polymer, prior to the spraying, with up to about 80% of their weight of cyclorubber. Such a mixture can be made by ball-milling the ingredients together until they have been comminuted to the desired fineness and homogeneously blended together. Obviously, a subsequent screening of the comminuted mixture may remove more of one ingredient than of the other from the mixture so it is preferable to comminute and screen the two ingredients separately and then mix them together.

In some instances it may be found desirable to include the cyclorubber in the first coat sprayed, to promote its strong adherence to the surface being coated, while it is omitted from subsequent coats.

Polyisobutylene also may be used as an auxiliary ingredient with ethylene polymers.

The coating of ethylene polymer, or of ethylene polymer and cyclorubber is sometimes improved, particularly with respect to its impermeability, by being baked, i. e., heated for an hour or so at a temperature at which the coating is considerably softened but below that which would bring about its oxidation or decomposition. Temperatures between 120° C. and 160° C. are preferred for this.

The following examples, X to XIV, illustrate ethylene polymer materials suitable for use in the present invention.

Example X

The material consists of ethylene polymer having a molecular weight of 21,000 and a screen analysis of:

| | Per cent |
|---|---|
| Through 50-mesh | 100 |
| Through 200-mesh | 8 |

Example XI

The material comprises ethylene polymer having a molecular weight of 25,000 combined with 74 parts, per 100 parts of resin, of cyclorubber. The material had a screen analysis of:

| | Per cent |
|---|---|
| Through 50-mesh | 100 |
| Through 200-mesh | 12 |

Example XII

The material comprised ethylene polymer having a molecular weight of 10,500 and mixed therewith 10 parts, per 100 parts of resin, of cyclorubber. The material had a screen analysis of:

| | Per cent |
|---|---|
| Through 80-mesh | 100 |
| Through 150-mesh | 5 |
| Through 200-mesh | 2 |

Example XIII

The material comprised an ethylene polymer having a molecular weight of 15,000 and 25 parts, per 100 parts of resin, of polyisobutylene. This material had a screen analysis of:

| | Per cent |
|---|---|
| Through 120-mesh | 100 |
| Through 200-mesh | 11 |

Example XIV

The material comprised ethylene polymer having a molecular weight of 21,000, 90 parts, per 100 parts of resin, of polyisobutylene, and 10 parts, per 100 parts of resin, of a thermoplastic phenol-formaldehyde resinoid which is a para-tertiary butyl phenol-formaldehyde condensate. This material had a screen analysis of:

| | Per cent |
|---|---|
| Through 50-mesh | 100 |
| Through 150-mesh | 10 |
| Through 200-mesh | 4 |

The following two examples illustrate methods of putting ethylene polymers into the required state of subdivision.

Example XV

A 20% solution of polyethylene (molecular weight 20,000) in boiling xylene is cooled. The resin precipitates and is separated by decantation and slurried with ethyl alcohol three times and then dried under vacuum. It is then screened to meet the requirements of the present invention.

Example XVI

A polyethylene of molecular weight 15,000 is compounded on mixing rolls, at 120° C., with three times its weight of calcium chloride, to give an apparently homogeneous mixture. This is sheeted off, and cooled in a closed container to prevent absorption of moisture. It is then broken down into small fragments and these are ball-milled to a fine powder. The powder is washed with water until free of calcium chloride, and then dried at 50° C. It is then ball-milled briefly to break up agglomerations, and then screened to meet the requirements of the present invention.

The coating deposited in accordance with the present invention and consisting of any of the materials of Examples X, XI and XII may be baked by exposure of the coated surface at a temperature between 120° C. and 160° C. for between 120 and 5 minutes. The resulting baked coating exhibits an improved hardness and impermeability.

It has been found that the methyl methacrylate polymers of the type commercially available cannot be flame-sprayed satisfactorily because the resulting coating is brittle and marred by bubbles but, if the ordinary polymer be dissolved in hot ethyl alcohol and reprecipitated, the resin thus obtained can be flame-sprayed under the conditions of the invention to yield sound continuous films.

The removal of alcohol-soluble material results also in removal of fractions of the polymer of low molecular weight but it is the absence of alcohol-soluble material, rather than the absence of material of low molecular weight, as such, which is the criterion of utility for purposes of this invention.

The following Examples XVII to XXI illustrate methyl methacrylate polymer compositions suitable for use in the present invention:

Example XVII

Methyl methacrylate polymer having a molecular weight of about 600,000 and free from alcohol-soluble material, was comminuted to pass an 80-mesh screen and contained only a minor proportion finer than 150-mesh.

Example XVIII

A copolymer of methyl methacrylate, 85 parts, and vinyl acetate, 15 parts, said copolymer having a molecular weight of about 35,000 and being free from alcohol-soluble material, was comminuted to pass a 50-mesh screen and freed of all but 15% of its weight of material finer than 200-mesh.

Example XIX

A copolymer of methyl methacrylate, 84 parts, and butadiene, 16 parts, was freed of alcohol-soluble materials and comminuted and screened to pass a 50-mesh screen and no more than 15% finer than 200-mesh.

Example XX

Plasticized methyl methacrylate resins were made up as follows:

|  | (a) | (b) | (c) |
|---|---|---|---|
| Polymerized methyl methacrylate (free of alcohol-soluble materials) | Parts 95 | Parts 80 | Parts 85 |
| Dibutyl phthalate | 5 | 20 |  |
| Dibutyl sebacate |  |  | 15 |

The composition was comminuted to a fineness between 80-mesh and 150-mesh.

Example XXI

A composition was made up of a mixture of equal parts of a copolymer of methyl methacrylate, 85 parts, and vinyl acetate, 15 parts, containing no alcohol-soluble material, and the polyvinyl butyral resin disclosed as in Example I. The mixture was milled to substantial homogeneity, ground and screened to exclude particles coarser than 50-mesh and finer than 200-mesh.

It will be seen from the above Examples XVI to XIX that methyl methacrylate polymers containing no alcohol-soluble material are adapted for use in the present invention where the polymer is 100% methyl methacrylate and also where the polymer is formed by copolymerizing methyl methacrylate with other polymerizable substances; the methyl methacrylate is, however, the predominating component in these copolymers.

The following example illustrates a use of the process of this invention to effect the bonding together of matching surfaces of metal:

Example XXII

Upon two clean flat plates of nickel-plated steel there are flame-sprayed two heavy coats of the polyvinyl butyral resin shown in Example I. While the pieces are still warm, the coated surfaces are pressed together and held under pressure until cool. The strength of the resulting bond between the plates was found to be 1500 pounds per square inch by direct pull at room temperature.

The invention provides a means of depositing upon relatively heat-resistant surfaces coatings of organic compounds which exhibit desirable combinations of properties. The respective combinations of properties offered by the three types of thermoplastic materials herein disclosed are not identical and it is necessary, as in the case of coatings deposited from solvent, to select that one whose combination of properties best meets the requirements of a given case.

The polyvinyl butyral resins are very readily applied by flame-spraying under the technique of this invention and a continuous impermeable coating may ordinarily be deposited by a single passage of the flame-spraying device across the work. The resulting coating adheres firmly, particularly to metals, and provides excellent protection against abrasion and against corrosion by alkalies and salt water, although not against acids. The coating is tough and flexible and, with the aid of plasticizer, retains these properties at very low temperatures. The polyvinyl butyral resins do not char when flame-sprayed properly and the resulting coating is substantially colorless. This facilitates coloration by the dispersion of suitable pigments in the resin prior to spraying it. The principal defects of a coating of polyvinyl butyral resin are its sensitivity to acid and its solubility in certain organic solvents, both of which defects are inherent properties of the resin itself, and also a tendency to be so fluid, when molten, as to make slightly difficult the adequate coating of edges and corners. These resins are readily compounded with plasticizers and readily comminuted by grinding.

The ethylene polymers are readily flame-sprayed and require in this operation no more care than is needed for the polyvinyl butyral resins. Further, they do not char and their adherence to metals is satisfactory although not quite so strong as the adherence of the polyvinyl butyral resin coatings to metals.

The coatings of ethylene polymers retain their toughness and adhesiveness at low temperatures without the use of plasticizers. These coatings are not affected by acids, alkalies, nor salts in aqueous solution, and afford corresponding protection to the surface beneath except insofar as they might be permeable to such liquids; the very slight permeability of these coatings as initially deposited, can ordinarily be reduced satisfactorily by a baking treatment. These coatings are substantially colorless but not completely transparent. They are resistant to most organic solvents at ordinary temperatures. A coating of unmodified ethylene polymer is noticeably less resistant to abrasion than is one of polyvinyl butyral resin but the incorporation of cyclorubber with the ethylene polymer before flame-spraying, distinctly improves the coating in this respect.

As the ethylene polymers are less readily comminuted by grinding than are the other two organic thermoplastic materials of this invention, it may be found preferable to use methods of precipitation in order to prepare them in the necessary finely-divided form.

Coatings of methyl methacrylate resins are less readily applied than those of the other thermoplastic materials because they depolymerize at temperatures somewhat above their effective melting point. Overheating of the resin in the flame does not result in charring but in a partial depolymerization which causes the formation of bubbles in the coating deposited. In color and in transparency, the coatings of methyl methacrylate resin are superior to those of the other two substances. Their resistance to alkalies and acids is good and noticeably superior to those of the other two substances at elevated temperatures. Their adhesion to metal is inferior to that of coatings of the polyvinyl butyral resins but better than the adhesion of the ethylene polymer coatings. The methyl methacrylate coatings suffer some impairment of toughness at low temperatures. These resins are readily prepared in the necessary fineness of particle size by grinding or by precipitation, followed by screening.

As many apparently widely different embodiments of this invention may be made without departing from the spirit and scope thereof, it is to be understood that the invention is not limited to the specific embodiments thereof except as defined in the appended claims.

We claim:

1. Process of providing a surface with a dense, homogeneous resin coating which comprises feeding into a flame-spraying device along with a fuel gas and oxygen, an organic thermoplastic material in the form of particles passing a 50-mesh screen and substantially all retained on a 200-mesh screen, said thermoplastic material essentially comprising a polymer selected from the group consisting of polyvinyl butyral resins of the following composition, by weight:

| | Per cent |
|---|---|
| Polyvinyl acetate | 0.0 to 1.0 |
| Polyvinyl alcohol | 10 to 20 |
| Polyvinyl butyral | 79 to 90 | fusible ethylene polymers having a molecular weight of at least about 10,000 and containing from 0% to 80%, by weight thereof, of cyclorubber, and methyl methacrylate polymers substantially free of material soluble in ethyl alcohol, and said fuel gas, oxygen, and thermoplastic material being so proportioned to insure complete combustion of said fuel gas and to give a smokeless spray of said thermoplastic material in the form of completely fused, molten droplets, and directing said spray upon said surface with said flame-spraying device held sufficiently close to said surface so that the droplets of thermoplastic material impinge thereon while still in molten condition.

2. Process of providing a surface with a dense, homogeneous resin coating which comprises stirring a finely divided, inert, inorganic material together with an organic thermoplastic material in the form of particles passing a 50-mesh screen and substantially all retained on a 200-mesh screen, to obtain a uniform mixture of discrete particles, said thermoplastic material essentially comprising a polymer selected from the group consisting of polyvinyl butyral resins of the following composition, by weight:

| | Per cent |
|---|---|
| Polyvinyl acetate | 0.0 to 1.0 |
| Polyvinyl alcohol | 10 to 20 |
| Polyvinyl butyral | 79 to 90 | fusible ethylene polymers having a molecular weight of at least about 10,000 and containing from 0% to 80%, by weight thereof, of cyclorubber, and methyl methacrylate polymers substantially free of a material soluble in ethyl alcohol, feeding said mixture of particles into a flame-spraying device along with a fuel gas and oxygen in proportions to insure complete combustion of said fuel gas and to give a smokeless spray of said thermoplastic material in the form of completely fused, molten droplets, and directing said spray upon said surface with said flame-spraying device held sufficiently close to said surface so that the droplets of thermoplastic material impinge thereon while still in molten condition.

3. Process of providing a surface with a dense, homogeneous resin coating which comprises feeding into a flame-spraying device along with a fuel gas and oxygen, a fusible ethylene polymer having a molecular weight of at least about 10,000 and containing from 0% to 80% of cyclorubber, said ethylene polymer being in the form of particles passing a 50-mesh screen and substantially all retained on a 200-mesh screen and said fuel gas, oxygen, and ethylene polymer being so proportioned to insure complete combustion of said fuel gas and to give a smokeless spray of said ethylene polymer in the form of completely fused, molten droplets, and directing said spray upon said surface with said flame-spraying device held sufficiently close to said surface so that the droplets of said ethylene polymer impinge thereon while still in molten condition.

4. Process of providing a surface with a dense, homogeneous resin coating which comprises stirring a finely divided, inert, inorganic material together with a fusible ethylene polymer having a molecular weight of at least about 10,000 and containing from 0% to 80% of cyclorubber, said ethylene polymer being in the form of particles passing a 50-mesh screen and substantially all retained on a 200-mesh screen, to obtain a uniform mixture of discrete particles, feeding said mixture of particles into a flame-spraying device along with a fuel gas and oxygen in proportions to insure complete combustion of said fuel gas and to give a smokeless spray of said ethylene polymer in the form of completely fused, molten droplets, and directing said spray upon said surface with said flame-spraying device held sufficiently close to said surface so that the droplets of said ethylene polymer impinge thereon while still in a molten condition.

MAURICE L. MACHT.
MALCOLM M. RENFREW.